(12) United States Patent
Cisternino

(10) Patent No.: US 8,714,214 B2
(45) Date of Patent: May 6, 2014

(54) MIS-FUEL INHIBITOR

(75) Inventor: Franco A. Cisternino, Deerfield, IL (US)

(73) Assignee: Illinois Tool Works, Glenview, IL (US)

( * ) Notice: Subject to any disclaimer, the term of this patent is extended or adjusted under 35 U.S.C. 154(b) by 122 days.

(21) Appl. No.: 13/255,845

(22) PCT Filed: Feb. 19, 2010

(86) PCT No.: PCT/US2010/024720
§ 371 (c)(1), (2), (4) Date: Sep. 9, 2011

(87) PCT Pub. No.: WO2010/104661
PCT Pub. Date: Sep. 16, 2010

(65) Prior Publication Data
US 2012/0024422 A1 Feb. 2, 2012

Related U.S. Application Data

(60) Provisional application No. 61/159,614, filed on Mar. 12, 2009.

(51) Int. Cl.
*B65B 1/04* (2006.01)

(52) U.S. Cl.
USPC ........... 141/350; 141/348; 141/349; 220/86.2

(58) Field of Classification Search
CPC ............................................. B60K 2015/0483
USPC .......................... 141/348–350, 367; 220/86.2
See application file for complete search history.

(56) References Cited

U.S. PATENT DOCUMENTS

| 5,465,861 | A * | 11/1995 | Kunz et al. ...................... 220/260 |
| 6,968,874 | B1 | 11/2005 | Gabbey et al. |
| 7,302,977 | B2 | 12/2007 | King et al. |
| 7,665,493 | B2 * | 2/2010 | Groom et al. ................. 141/350 |
| 7,950,425 | B2 * | 5/2011 | Och ............................... 141/367 |
| 7,967,041 | B2 * | 6/2011 | Groom et al. ................. 141/367 |
| 7,967,042 | B2 * | 6/2011 | Groom et al. ................. 141/367 |
| 8,191,588 | B2 * | 6/2012 | Hagano ......................... 141/350 |
| 2009/0020182 | A1 | 1/2009 | Groom et al. |
| 2012/0312420 | A1 * | 12/2012 | Kataoka et al. ............... 141/350 |

FOREIGN PATENT DOCUMENTS

| DE | 4039269 C1 | 2/1992 |
| EP | 0645274 B1 | 4/1997 |
| EP | 1262355 B1 | 11/2003 |
| EP | 1284212 B1 | 12/2003 |
| EP | 1690727 A2 | 8/2006 |
| FR | 2710721 A1 | 4/1995 |
| GB | 2421499 A | 6/2006 |
| WO | 2005077698 A1 | 8/2005 |

OTHER PUBLICATIONS

ISR for PCT/US2010/024720 dated Jun. 30, 2010.

* cited by examiner

*Primary Examiner* — Timothy L Maust
*Assistant Examiner* — Timothy P Kelly
(74) *Attorney, Agent, or Firm* — Mark W. Croll; Paul F. Donovan

(57) ABSTRACT

A mis-fuel inhibitor in an inlet neck assembly of a vehicle fuel system discriminates between nozzle diameters, allowing entrance of nozzle diameters at or greater than a predetermined minimum diameter while inhibiting entrance of nozzles having diameters less than the predetermined minimum diameter. An actuator responsive to nozzle diameters engages and disengages locking arms that are associated with a primary shutoff valve flapper door.

19 Claims, 8 Drawing Sheets

MIS-FUEL INHIBITOR

CROSS-REFERENCE TO RELATED APPLICATIONS

The present application is national phase of PCT/US2010/024720 filed Feb. 19, 2010, and claims the benefits of U.S. Provisional Application Ser. No. 61/159,614, filed on Mar. 12, 2009.

FIELD OF THE INVENTION

The present invention relates generally to vehicle fuel systems and the refueling structures thereof provided to receive fuel into the vehicle fuel system. More particularly the invention relates to vehicle fuel system inlet neck assemblies having inlet openings with diameters that are larger than the nozzle diameters of refueling systems for dispensing fuels of types other than the fuel intended for the vehicle, and still more particularly to structures for preventing mis-fueling a vehicle fuel system with unintended fuels.

BACKGROUND OF THE INVENTION

It is known to provide refueling system nozzles of different sizes so that an individual operating the refueling system can be aware of the type of fuel that will be dispensed from the system, and to prevent the inadvertent deposit of a wrong fuel, such as diesel fuel, into some vehicles, such as gasoline powered automobiles. It is known, for example, to provide nozzles for dispensing diesel fuel of a larger diameter than the nozzles for dispensing gasoline or urea. Accordingly, an individual cannot inadvertently dispense diesel fuel from a diesel fuel refueling system into an automobile fuel system requiring gasoline in that an inlet opening at the inlet end of the automobile fuel system will have an opening smaller than the diameter of a diesel fuel dispensing nozzle.

By way of further example, a urea dispensing nozzle commonly has a diameter of 19 mm and a gasoline dispensing nozzle commonly has a diameter of 21 mm. Vehicle fuel systems intended to receive such fuels are provided with fuel system inlet openings only minimally larger than the dispensing nozzle diameter for the fuel intended. Diameters for diesel fuel refueling system dispensing nozzles intended for passenger cars and light trucks are generally between 23.6 mm and 25.5 mm, while high flow rate diesel fuel dispensing nozzles intended for heavy-duty trucks are provided in diameters of 28.5 mm to 38 mm to enable faster dispensing of larger fuel volumes. Again, the inlet openings of vehicle fuel systems intended to be refueled with diesel fuel are provided with opening diameters only minimally larger than the dispensing nozzle diameter from which it is intended to be refueled.

Accordingly, it can be appreciated that the nozzle for diesel fuel dispensing systems generally will not fit into the refueling inlet openings of gasoline or urea fuel systems, and it is therefore unlikely that a fuel system requiring gasoline or urea will be refueled inadvertently with diesel fuel. However, because of the larger diameters at the refueling inlet openings of diesel fuel systems, a vehicle requiring diesel fuel can be refueled inadvertently from a refueling system having a urea dispensing nozzle or a gasoline dispensing nozzle. Refueling with improper fuel can cause damage to fuel systems and engines and therefore must be avoided.

Some nozzle inhibiting structures are known, and can prevent a smaller nozzle from a gasoline or urea refueling system from being inserted into a refueling inlet opening for a diesel fuel system. However, some such known structures are overly complex, complicating assembly, installation or retrofitting on existing systems; as well as compromising performance reliability under some situations. Some are not adequately reliable, and can be forced to admit a smaller nozzle through excessive or angular force applied when trying to insert a smaller nozzle. Accordingly a simple yet reliable structure for inhibiting inadvertent mis-fueling of diesel fuel systems is desirable.

SUMMARY OF THE INVENTION

A mis-fuel inhibitor assembly in a fuel inlet of a fuel system includes an actuator upstream of a fuel system primary shutoff valve and having interlocking structure with the primary shutoff valve to prevent the valve from opening unless a nozzle of adequate size is inserted. Activation of the actuator disengages the interlocking structure and enables the primary shutoff valve to open and allow insertion of the nozzle. The actuator is responsive only to nozzles of a specified diameter or larger, so that nozzles having diameters smaller than the standard nozzle for the intended fuel do not initiate the actuator to adjust the interlocking structure, and the smaller nozzle is inhibited from accessing the fuel system.

In one aspect of one form thereof, the present invention provides an inhibitor for a vehicle fuel system refueling inlet assembly for limiting fuel nozzle access by nozzle diameter, with a movable obstruction blocking access to the inlet assembly. An actuator responsive to nozzle diameter upstream of the obstruction includes an expandable opening. A locking member connected to the actuator selectively engages and disengages the obstruction dependent upon a size of the expandable opening.

In another aspect of another form thereof, the present invention provides a vehicle fuel system inlet neck assembly with an inhibitor for limiting fuel nozzle access by nozzle diameter. The inhibitor has an expandable opening therethrough. A primary shutoff is positioned with respect to the inhibitor to receive a refueling nozzle inserted through the expandable opening. The primary shutoff includes a moveable obstruction blocking entrance to the fuel system downstream from the primary shutoff. The inhibitor includes an actuator having a movable portion defining the expandable opening, the movable portion being responsive to refueling nozzles of an established minimum diameter to expand the expandable opening. A locking arm projects from the movable portion and engages the movable obstruction absent a nozzle of the established minimum diameter and disengages the movable obstruction in the presence of a nozzle of at least the established minimum diameter inserted through the expandable opening.

In a still further aspect of a still further form thereof, the present invention provides a vehicle fuel system refueling nozzle inlet inhibitor for limiting fuel nozzle access by nozzle diameter, with an actuator having first and second groups of peripherally connected segments defining an opening having a diameter smaller than a minimum acceptable nozzle diameter and larger than a maximum unacceptable nozzle diameter. The opening expands under force exerted by insertion of a nozzle of at least the minimum acceptable diameter causing movement of the segments. First and second locking arms extend toward one another from two of the segments.

One advantage of one form of the present invention is that a mis-fuel inhibitor can be used in an inlet neck assembly of a motor vehicle fuel system to minimize the opportunities for refueling the vehicle with improper fuel.

Another advantage of another form of the present invention is that a refueling pump nozzle smaller than an intended refueling nozzle size can be restricted from entering a vehicle fuel system during a refueling operation.

Still another advantage of still another form of the invention is that common nozzle sizes for gasoline and urea refueling pumps can be inhibited from entering a diesel fuel system inlet neck assembly so that the possibility of refueling a diesel fuel system with gasoline or urea is reduced.

Other features and advantages of the invention will become apparent to those skilled in the art upon review of the following detailed description, claims and drawings in which like numerals are used to designate like features.

Figure 1:
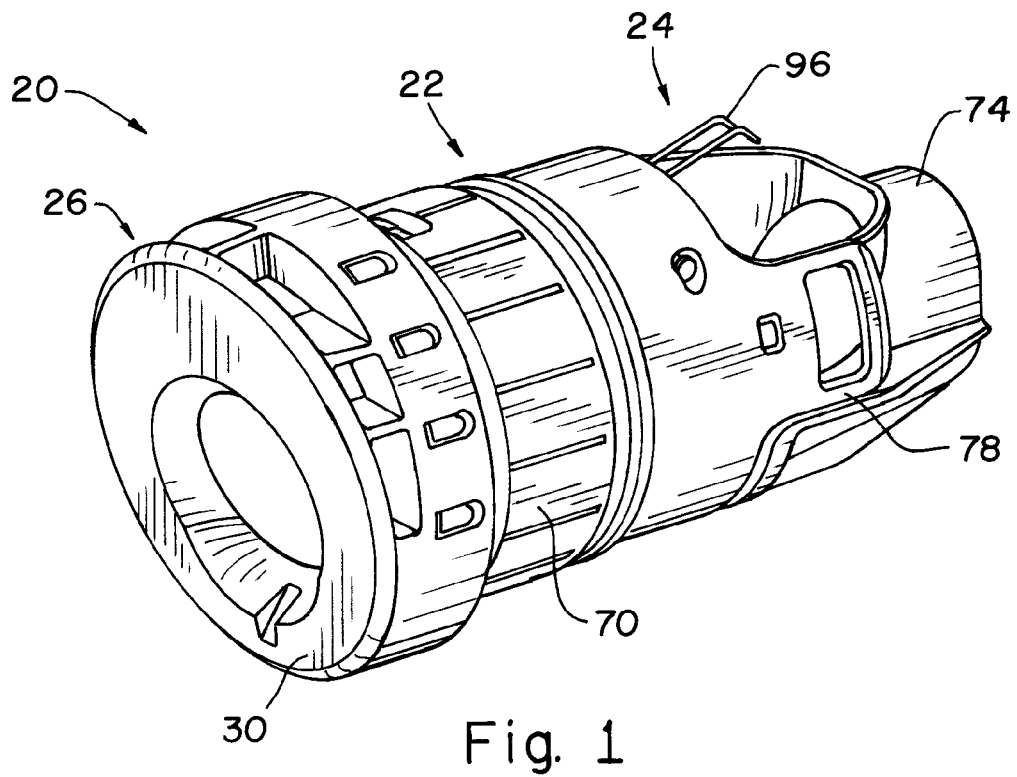
FIG. 1 is a perspective view of a vehicle fuel system inlet neck assembly having a mis-fuel inhibiting device therein.

Before the embodiments of the invention are explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein are for the purpose of description and should not be regarded as limiting. The use herein of "including", "comprising" and variations thereof is meant to encompass the items listed thereafter and equivalents thereof, as well as additional items and equivalents thereof.

DETAILED DESCRIPTION OF THE PREFERRED EMBODIMENT

Figure 2:
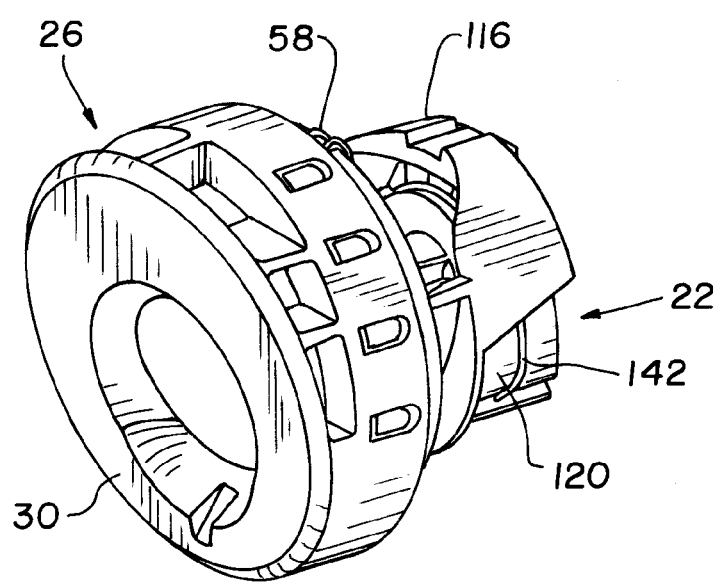
FIG. 2 is a perspective view of a fragmentary portion, and more specifically the outer portion of the fuel system inlet neck assembly shown in FIG. 1.

Referring now more specifically to the drawings and to FIGS. 1 and 2 in particular, a vehicle fuel system refueling inlet neck assembly 20 is shown having a mis-fuel inhibitor 22 as a part thereof for preventing the insertion of a refueling nozzle that is smaller in diameter than the nozzles provided for the intended fuel. Inlet neck assembly 20 is shown as a capless refueling system having a primary shutoff valve 24 and a capless outer service cover assembly 26. However, those skilled in the art will readily recognize that mis-fuel inhibitor 22 can be incorporated into the inlet neck of a vehicle fuel system having a removable outer cap thereon as well. The capless structure shown is merely one suitable arrangement in which the mis-fuel inhibitor can be used advantageously, but is not intended to limit applications and uses of the present invention, nor the scope of the claims that follow.

Mis-fuel inhibitor 22 is operably positioned between outer service cover assembly 26 and primary shutoff valve 24 and structurally cooperates with primary shutoff valve 24 to enable and disable opening of primary shutoff valve 24 when a refueling nozzle is inserted. The components of mis-fuel inhibitor 22, shutoff valve 24 and outer service cover assembly 26 to be described hereinafter can be made of suitable fuel resistant materials, including various plastics and metals that are well known to those skilled in the art.

Figure 3:
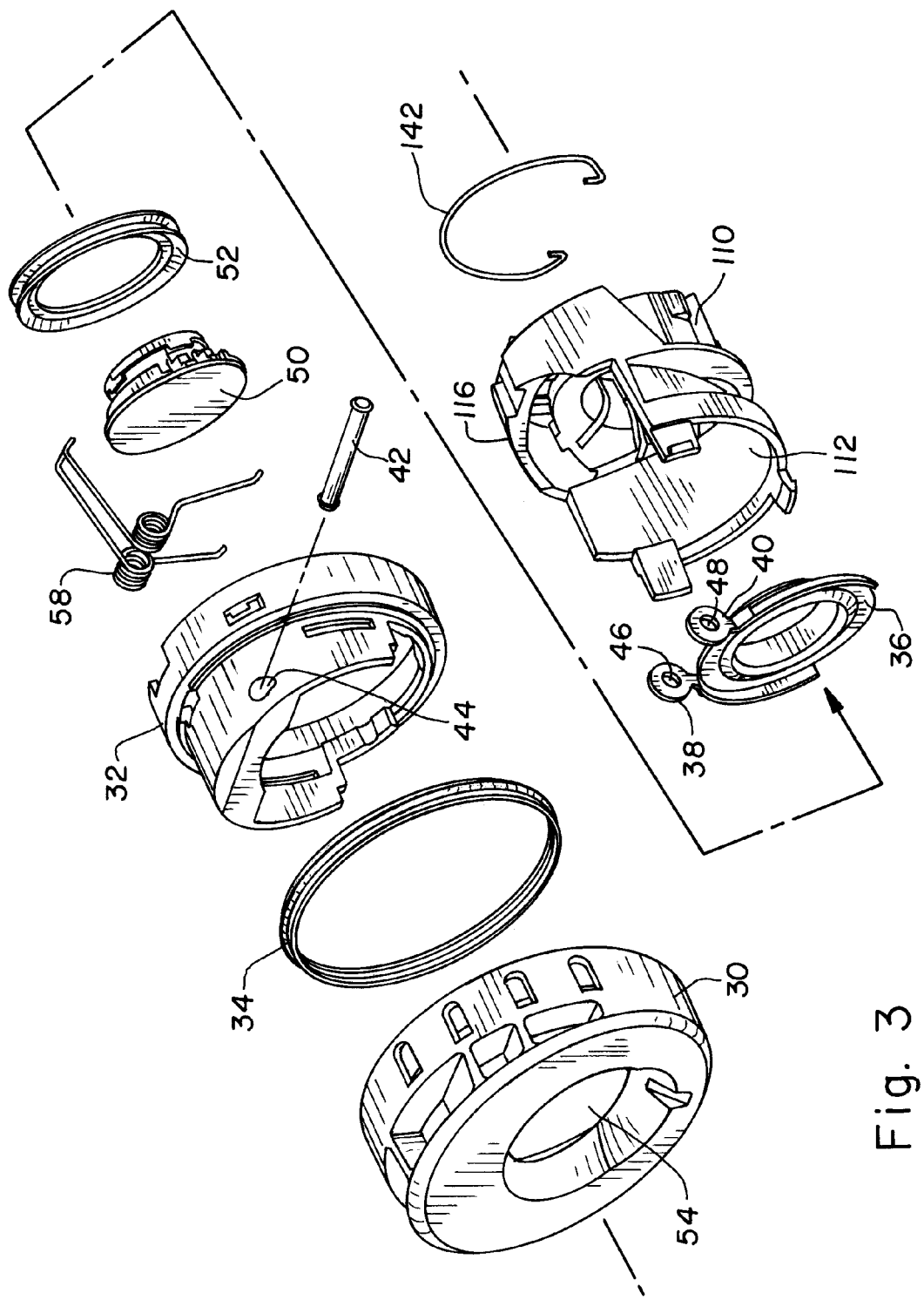
FIG. 3 is an exploded view of the fragmentary portion of the inlet neck assembly shown in FIG. 2.
Figure 4:
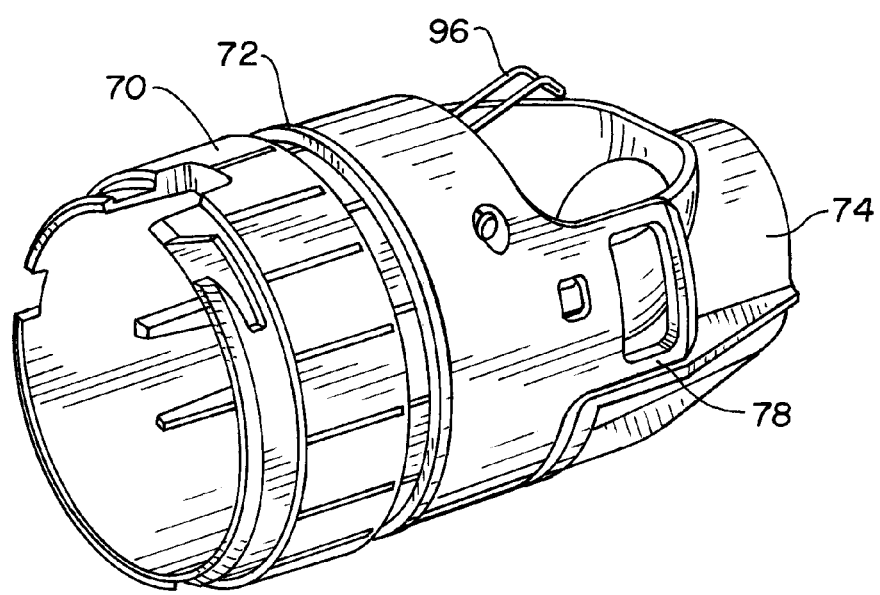
FIG. 4 is a perspective view of another fragmentary portion, and more specifically the inner portion of the fuel system inlet neck assembly shown in FIG. 1.
Figure 6:
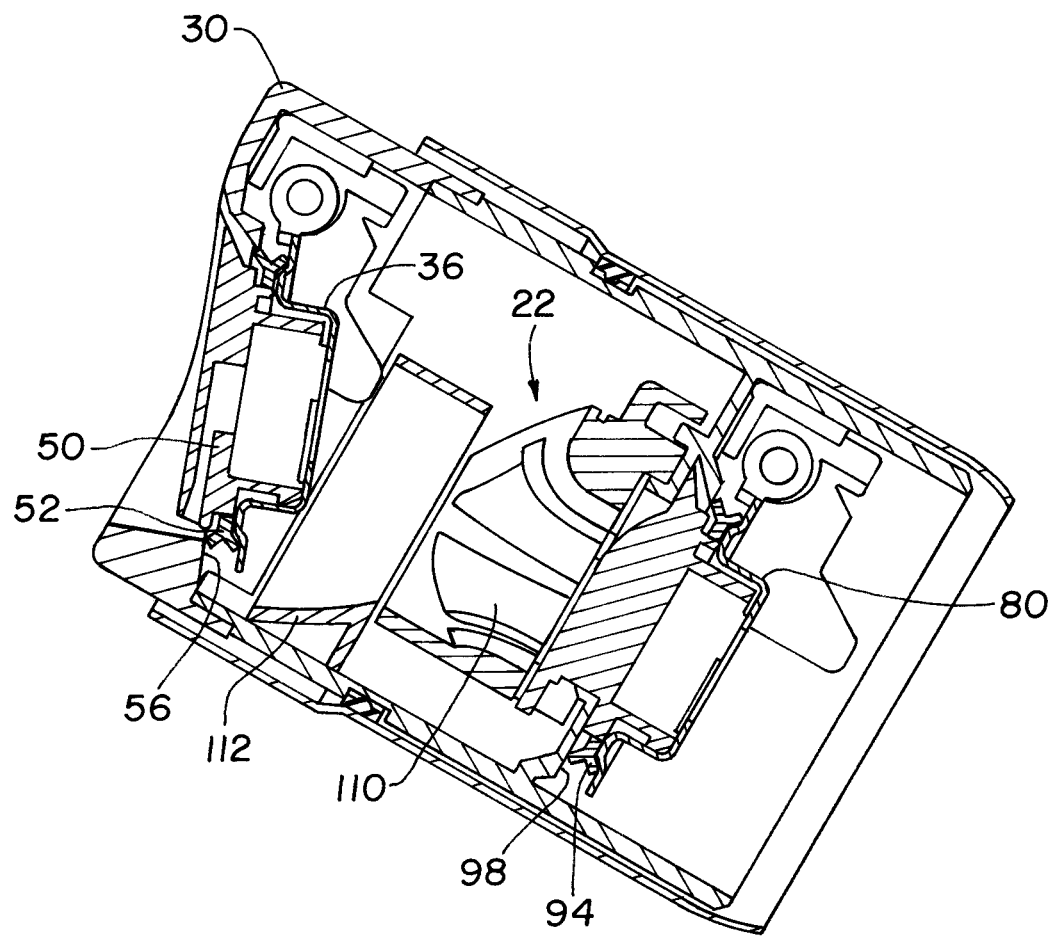
FIG. 6 is a cross-sectional view of the vehicle fuel system inlet neck assembly shown in FIG. 1.
Figure 7:
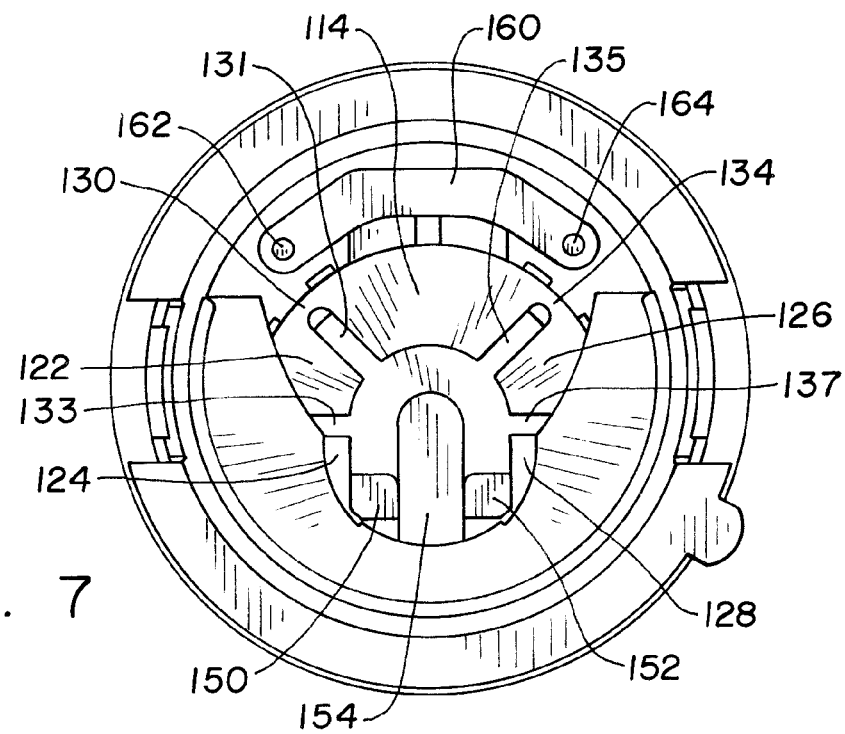
FIG. 7 is an end view of the inlet neck assembly shown in a locked condition.
Figure 8:
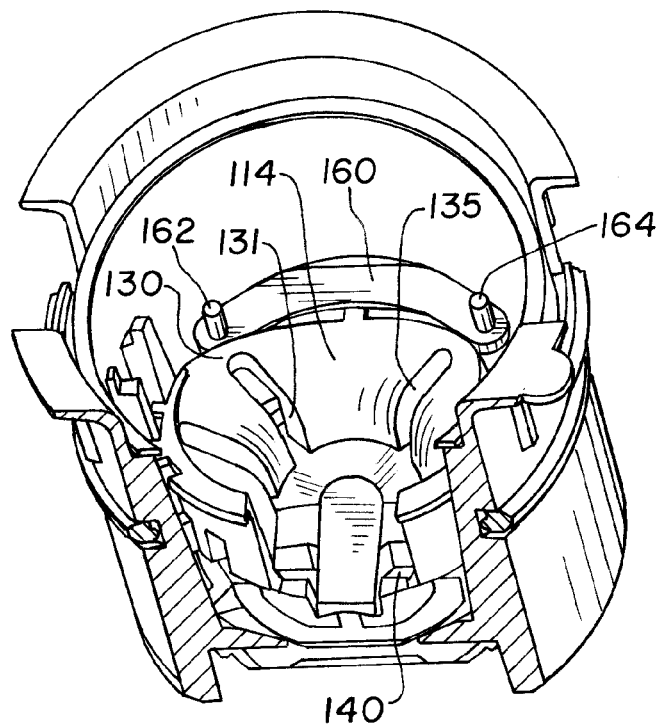
FIG. 8 is a perspective view of the inlet neck assembly in an unlocked condition.

Outer service cover assembly 26 (FIG. 3) includes a service cover 30, an annular outer body 32 and a seal 34. Annular outer body 32 pivotally holds a service flapper door carrier 36 having ears 38, 40 held to annular outer body 32 by a pivot pin 42 received in a channel 44 of the outer body and in holes 46, 48 of ears 38, 40. Flapper door carrier 36 holds a service flapper door 50 and a flapper door seal 52. Service cover 30 defines an opening 54 and an inner shoulder 56 (FIG. 6). A service flapper door spring 58 biases flapper door carrier 36 toward a closed position wherein flapper door 50 is positioned in opening 54 and seal 52 is engaged against shoulder 56.

Figure 5:
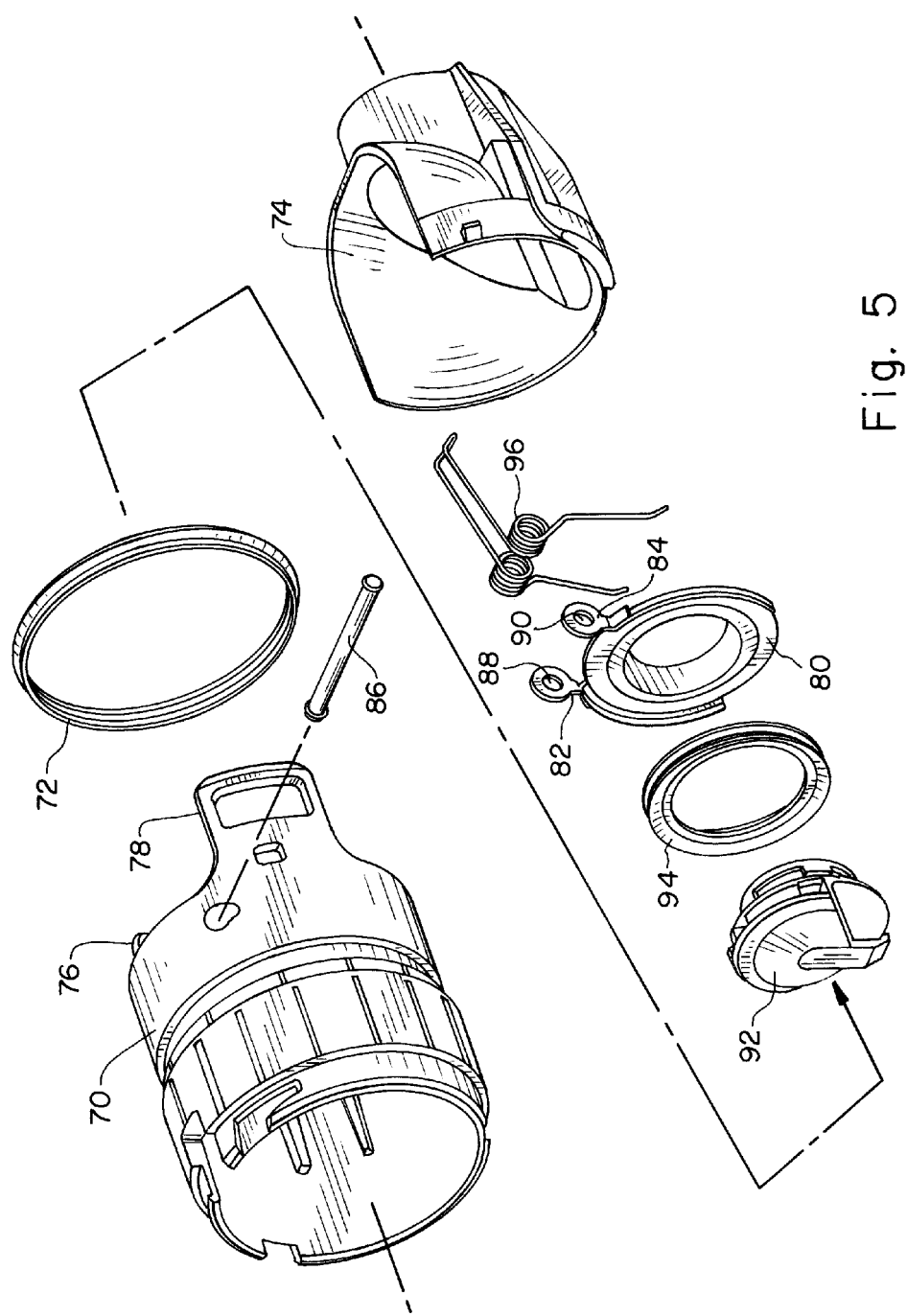
FIG. 5 is an exploded view of the fragmentary portion of the inlet neck assembly shown in FIG. 4.

Primary shutoff valve 24 (FIG. 5) includes a generally annular body 70, an annular seal 72 and a nozzle guide 74. Nozzle guide 74 is received between and engaged by tabs 76, 78 of body 70 and may include protrusions received in windows of the tabs to secure the connection of nozzle guide 74 to annular body 70. A primary shutoff valve flapper door carrier 80 having ears 82, 84 is held to body 70 by a pivot pin 86 received in holes 88, 90 of ears 82, 84. Flapper door carrier 80 holds a primary shutoff valve flapper door 92 and a primary valve flapper door seal 94. A spring 96 biases flapper door 92 toward a closed position in which seal 94 is held against a shoulder 98 (FIG. 6).

Mis-fuel inhibitor 22 includes an actuator 110 and a nozzle guide 112 leading into actuator 110. In the exemplary embodiment shown, nozzle guide 112 is a substantially semi-cylindrical projection upstream of actuator 110 Actuator 110 includes a bridge section 114 connected to a dome 116.

Figure 11:
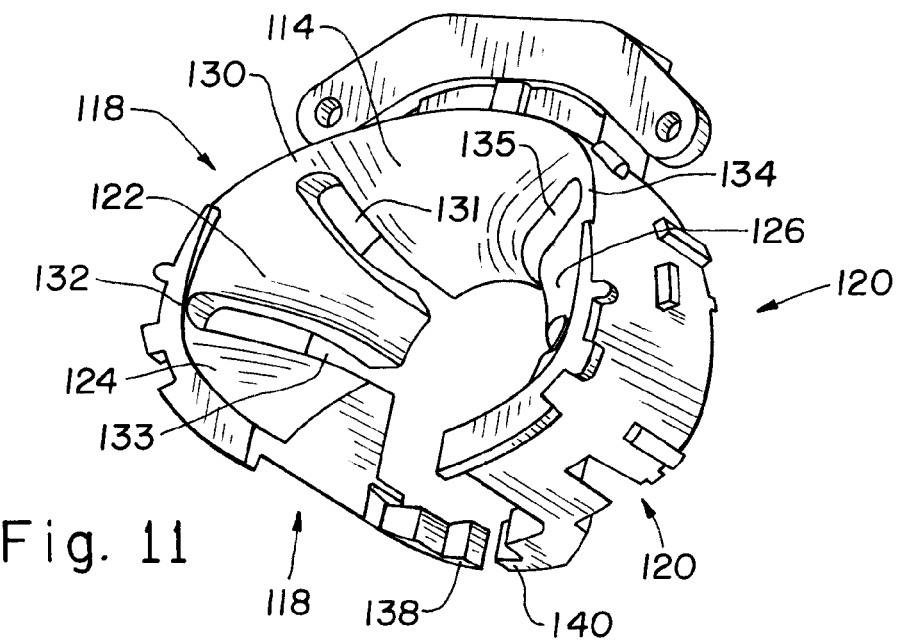
FIG. 11 is a perspective view of the actuator in the mis-fuel inhibiting device.
Figure 12:
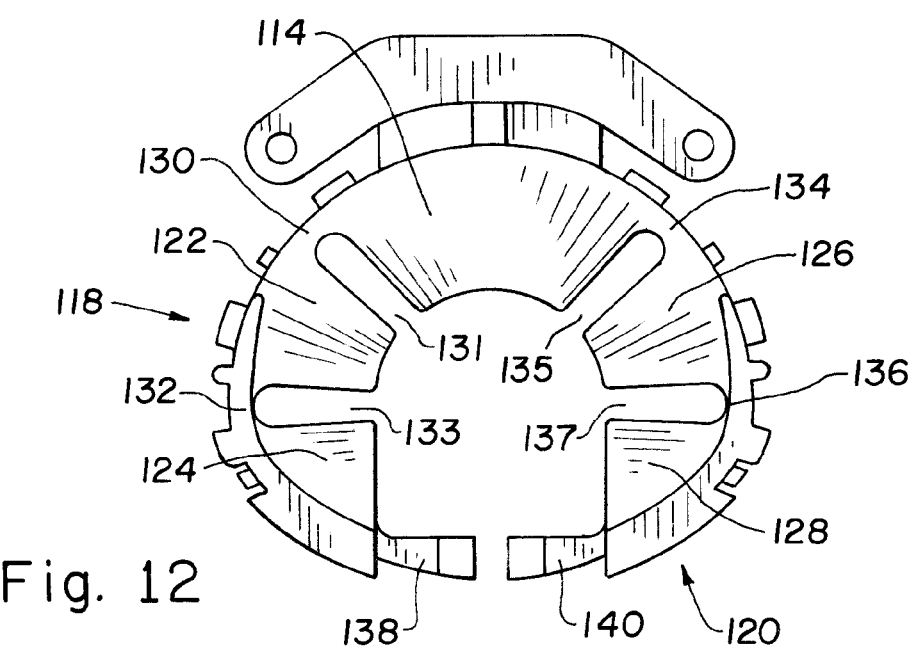
FIG. 12 is an elevational view of the actuator shown in FIG. 11

Actuator 110 (FIGS. 11 and 12) further includes side wings 118, 120 extending from opposite ends of bridge section 114. Wings 118, 120 each include a plurality of wing sections or segments. In the exemplary embodiment shown, wing 118 includes wing segments 122, 124 and wing 120 includes wing segments 126, 128. Relatively thin connecting areas are provided between bridge section 114 and each wing 118, 120 and between adjacent wing segments 122, 124 and 126, 128 comprising the wings. Accordingly, a relatively thin connecting area 130 is provided between bridge section 114 and wing segment 122, and an outwardly closed, radial space 131 is provided between bridge section 114 and wing segment 122. A relatively thin connecting area 132 and an outwardly closed radial space 133 are provided between wing segment 122 and wing segment 124. A relatively thin connecting area 134 and an outwardly closed radial space 135 are provided between bridge section 114 and wing segment 126, and a relatively thin connecting area 136 and an outwardly closed radial space 137 are provided between wing segment 126 and wing segment 128.

Inwardly directed arms 138, 140 are provided at the distal ends of wings 118, 120, respectively. Arms 138, 140 engage and operate with primary shutoff valve flapper door 92, as will be described subsequently herein. A hoop spring 142 surrounds actuator 110 and engages distal wing segments 124, 128 of wings 118, 120. Hoop spring 142 constricts wings 118, 120 and resists outward expansion of the wings.

The distal or remote ends of wings 118, 120 are free, and not connected to each other or to other structure within the actuator other than through the interconnection of hoop spring 142. Accordingly, the relatively thin connecting areas and radial spaces described above allow wings 118, 120 to flex and bend under pressure exerted from a nozzle being inserted during a refueling operation when the pressure exerted thereby is sufficient to overcome the resistance supplied by hoop spring 142. Absent such pressure for expansion, wings 118, 120 are held in a constricted condition by hoop spring to 142.

Primary shutoff valve flapper door 92 defines recessed areas 150, 152 on opposite sides of and behind a post 154 at the bottom of flapper door 92. In the closed or constricted condition of actuator 110, arms 138, 140 project through recessed areas 150, 152 and behind post 154. Accordingly, with actuator 110 in the constricted condition, arms 138, 140 engage flapper door 92 and lock the flapper door in a closed condition. Sufficient outward expansion of both wing 118 and wing 120 moves each arm 138, 140 outwardly from behind post 154, thereby allowing the primary shutoff valve flapper door to move.

A clip 160 and pins 162, 164 can be used to attach and hold mis-fuel inhibitor 22 within the assembly. By pinning bridge section 114 in a fixed position, wings 118, 120 are allowed to move independently. Movement of one wing does not cause movement of the other wing.

Wings 118, 120 define an expandable open area at the radially inward edges thereof. The open area defined between the inward edges of wings 118, 120 defines an expendable axial passage through actuator 110, which is expanded by the outward deflection of the wings. In a relaxed state of actuator 110, under the influence of hoop spring 142, the opening defined is of smaller diameter than the diameter of the smallest acceptable refueling nozzle to be received in the fuel system and is larger than the diameters of refueling nozzles for unacceptable fuels that are to be prevented from completely entering inlet neck assembly 20.

Figure 9:
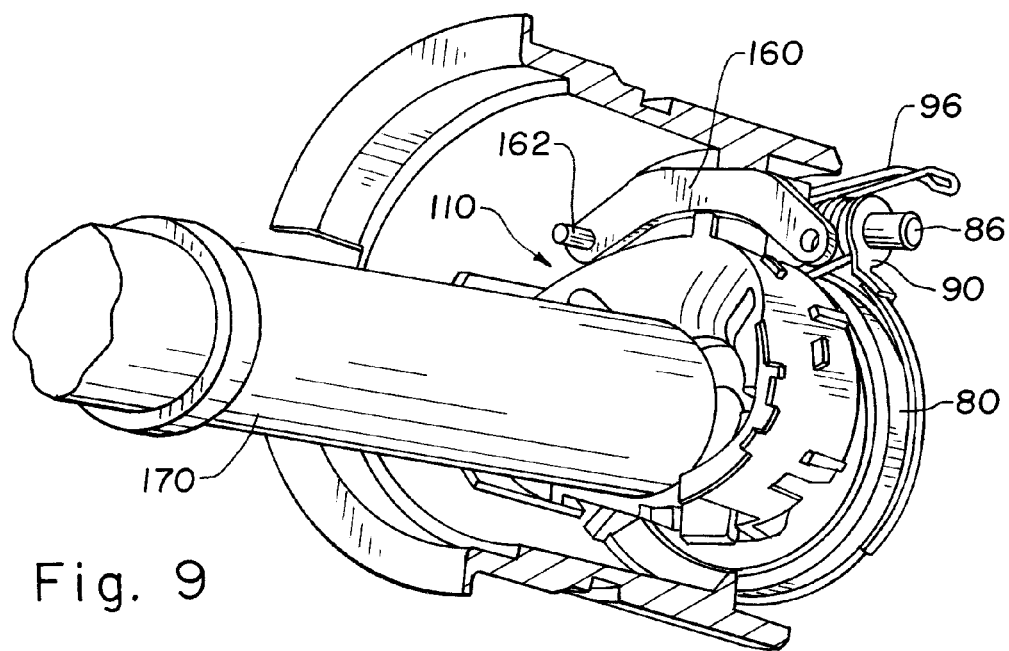
FIG. 9 is a perspective view, partially broken away and illustrating a nozzle being inserted into the inlet neck assembly.
Figure 10:
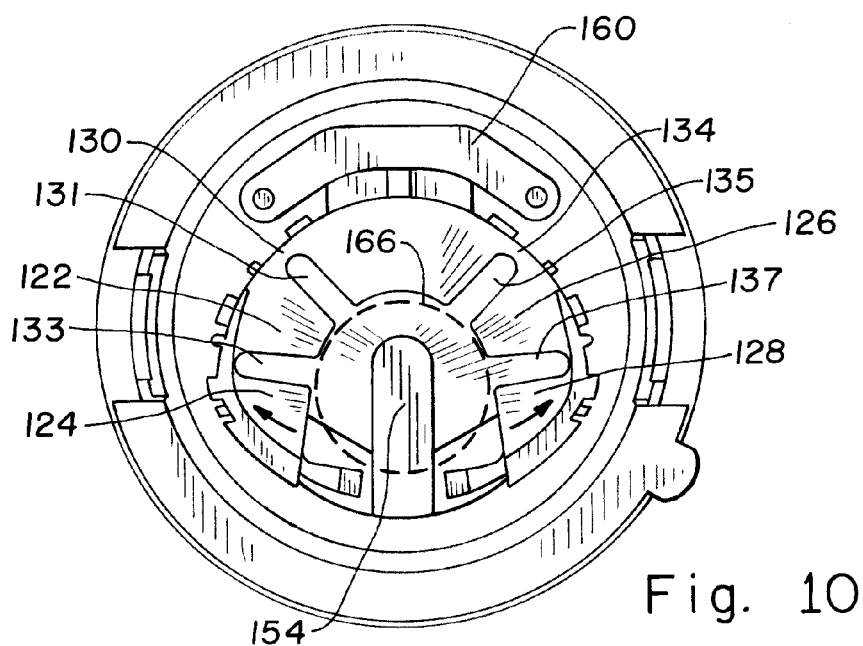
FIG. 10 is an elevational end view of the outer and of the inlet neck assembly.

As illustrated by the dashed line in FIG. 10, which is designated with reference number 166, an object of a given diameter or smaller can be inserted without expanding the wings, and an object such as a refueling nozzle 170 (FIG. 9) of the prescribed diameter or larger can be pushed past actuator 110 only by deflecting the wings 118, 120 outwardly. When the wings are deflected outwardly a sufficient distance, arms 138, 140 disengage from primary shutoff valve flapper door 92 and allow the door to move. Accordingly, if a refueling nozzle smaller than the required diameter is inserted the wings are not deflected outwardly, arms 138, 140 remain engaged with primary shutoff valve flapper door 92 and the door remains in a locked condition. The nozzle smaller than the required diameter is not allowed to pass through and beyond actuator 110. On the other hand, if a nozzle of the prescribed diameter or greater is inserted, wings 118, 120 are deflected outwardly together with arms 138, 140 which disengage from primary shutoff valve flapper door 92. The door is unlocked and allowed to move. Further force of inserting the nozzle moves the flapper door upwardly and away, thereby allowing the nozzle to pass through the expanded opening in actuator 110 and beyond the primary shutoff valve.

As can be seen also in FIG. 10, wings 118, 120 together with bridge section 114 generally define an inverted U-shaped structure that is open radially at the bottom and has the fixed portion of bridge section 114 substantially opposite to the opening defined between the distal ends of wings 118, 120. Accordingly, upward or downward force from a nozzle of insufficient diameter does not cause spreading or expansion of wing segments, and primary shutoff valve flapper door 92 remains in a closed and locked condition. Further, lateral force exerted by a nozzle of insufficient diameter also fails to unlock the primary shutoff valve flapper door. If a nozzle smaller than the required diameter is pressed laterally against either wing 118 or 120, the wing against which force is exerted may be caused to move outwardly; however, even if the arm of the wing is moved sufficiently to disengage from the primary shutoff valve flapper door 92, the other wing and arm connected thereto will remain in the inward or constricted position, and the primary shutoff valve flapper door will remain closed and locked.

The various wing segments 122, 124, 126, 128 can be provided with upstream facing surfaces that angle downstream in the radially inward direction from the outer periphery thereof to the inner diameter defined by the inner edges of the wing segments. Accordingly, as a refueling nozzle is inserted, the nozzle is naturally directed toward the opening between the actuator wings to a generally centered position whereby continued insertion of a nozzle of sufficient diameter operates against both wings uniformly. Chamfered and/or angular surfaces can be provided throughout the assembly to facilitate and direct the insertion of a refueling nozzle.

During a refueling operation, a refueling nozzle is inserted through service cover assembly 26 by force exerted against service flapper door 50. As the nozzle is inserted, service flapper door carrier 36 is pivoted on pivot pin 42 to allow the nozzle to pass through opening 54. As the end of the nozzle approaches primary shutoff valve flapper door 92, the locked flapper door is a movable obstruction to further insertion of the nozzle. Actuator 110 discriminates between nozzle diameters smaller than the prescribed acceptable diameter and those as large as or larger than the prescribed acceptable diameter. Nozzles of smaller than acceptable diameter do not engage and expand wing segments 122, 124, 126, 128 sufficiently to disengage both arms 138, 140 from primary shutoff valve flapper door 92, and the flapper door remains locked. A nozzle of diameter at least as large as the minimum acceptable diameter engages and expands the opening through the actuator by moving wing segments 122, 124, 126, 128 outwardly sufficiently to disengage the arms from the primary shutoff valve flapper door 92, thereby unlock the flapper door and allowing it to move. As the nozzle is inserted further, the primary valve flapper door is deflected sufficiently so that the nozzle end can be inserted therethrough and the refueling operation completed. Upon completion, when the nozzle is removed, primary shutoff valve flapper door 92 and service entrance flapper door 50 each return to their closed positions under the influence of the respective flapper door springs 58 and 96.

Accordingly, structure is provided to allow the insertion of nozzles having diameters at or above the required minimum diameter, while excluding nozzles having smaller diameters. The structure of actuator 110 will not open to allow a smaller nozzle to enter even if force is applied against some, but not all of the wing segments. The required multi-directional forces are applied when a nozzle of a diameter larger than narrowed opening is inserted, but are not achieved if a nozzle smaller than narrowed opening is inserted, even if the smaller nozzle is forced against some of the wing segments 122, 124, 126, 128.

Variations and modifications of the foregoing are within the scope of the present invention. It is understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments to the extent permitted by the prior art.

Various features of the invention are set forth in the following claims.

What is claimed is:

1. An inhibitor for a vehicle fuel system refueling inlet assembly for limiting fuel nozzle access by nozzle diameter, said inhibitor comprising:
   a movable obstruction blocking access through the inlet assembly;
   an actuator responsive to nozzle diameter upstream of said movable obstruction, said actuator including a non-circular expandable opening; and
   a locking member connected to said actuator and selectively engaging and disengaging said movable obstruction dependent upon a size of said non-circular expandable opening, such that when said locking member is caused to disengage said movable obstruction to enable fuel nozzle access, said locking member is moved a sufficient distance to prevent engagement with the fuel nozzle.

2. The inhibitor of claim 1, wherein said actuator having a fixed portion and movable wings on opposite ends of said fixed portion.

3. The inhibitor of claim 2, wherein each of said movable wings have an arm selectively engaging said movable obstruction.

4. The inhibitor of claim 2, wherein each of said movable wings include a plurality of wing segments.

5. The inhibitor of claim 4, wherein distal segments of each of said movable wings have an arm selectively engaging said movable obstruction.

6. The inhibitor of claim 4, wherein said movable obstruction being a primary shutoff valve flapper door.

7. The inhibitor of claim 6, wherein distal segments of each of said movable wings have an arm selectively engaging said flapper door.

8. The inhibitor of claim 7, wherein with adjacent wing segments connected to one another by flexible connections.

9. A vehicle fuel system inlet neck assembly, comprising:
   a service flapper door being arranged so that when closed, said service flapper door is non-perpendicularly positioned with respect to an axis extending through the fuel system assembly;
   an inhibitor located downstream from said service flapper door for limiting fuel nozzle access by nozzle diameter, said inhibitor having a non-circular expandable opening therethrough;
   a primary shutoff positioned with respect to said inhibitor to receive a refueling nozzle inserted through said non-circular expandable opening, said primary shutoff including a moveable obstruction blocking entrance to the fuel system downstream from the primary shutoff;
   said inhibitor including an actuator having a movable portion defining said non-circular expandable opening, said movable portion being responsive to refueling nozzles of an established minimum diameter to expand said non-circular expandable opening; and
   a locking arm projecting from said movable portion and engaging said movable obstruction absent a nozzle of the established minimum diameter and being disengaged from said movable obstruction by a nozzle of at least the established minimum diameter being inserted through said non-circular expandable opening.

10. The inlet neck assembly of claim 9, wherein said actuator having a fixed portion and movable wings on opposite ends of said fixed portion.

11. The inlet neck assembly of claim 10, wherein said movable wings being independently movable with respect to each other.

12. The inlet neck assembly of claim 10, wherein each of said movable wings have a locking arm associated with said movable obstruction.

13. The inlet neck assembly of claim 10, wherein each of said movable wings have a plurality of wing segments movable with respect to one another.

14. The inlet neck assembly of claim 10, wherein said movable obstruction being a flapper door.

15. The inlet neck assembly of claim 9, wherein said actuator defining a U-shaped construction having a radial opening and a fixed portion opposite said radial opening, with movable portions opposed to one another and defining said expandable opening there between.

16. A vehicle fuel system refueling nozzle inlet inhibitor for limiting fuel nozzle access by nozzle diameter, said inhibitor comprising:
   an actuator having first and second groups of peripherally connected segments defining an axial non-circular opening through said actuator, said non-circular opening defining a diameter smaller than a minimum acceptable nozzle diameter and larger than a maximum unacceptable nozzle diameter, said actuator defining a U-shaped construction having a radial opening and a fixed portion opposite said radial opening, with movable portions opposed to one another and defining said expandable axial non-circular opening there between;
   said axial non-circular opening expanding under force exerted by insertion of a nozzle of at least the minimum acceptable diameter causing movement of said segments; and
   first and second locking arms extending toward one another from two of said segments.

17. The nozzle inlet inhibitor of claim 16, wherein including a flapper door obstructing insertion of a refueling nozzle, and said first and second locking arms engaging said flapper door without expansion of said opening and disengaging said flapper door upon expansion of said opening.

18. The nozzle inlet inhibitor of claim 16, wherein said actuator including first and second independently movable wings.

19. The nozzle inlet inhibitor of claim 18, wherein said first and second independently movable wings each including a plurality of independently movable wing segments.

* * * * *